Patented Feb. 13, 1951

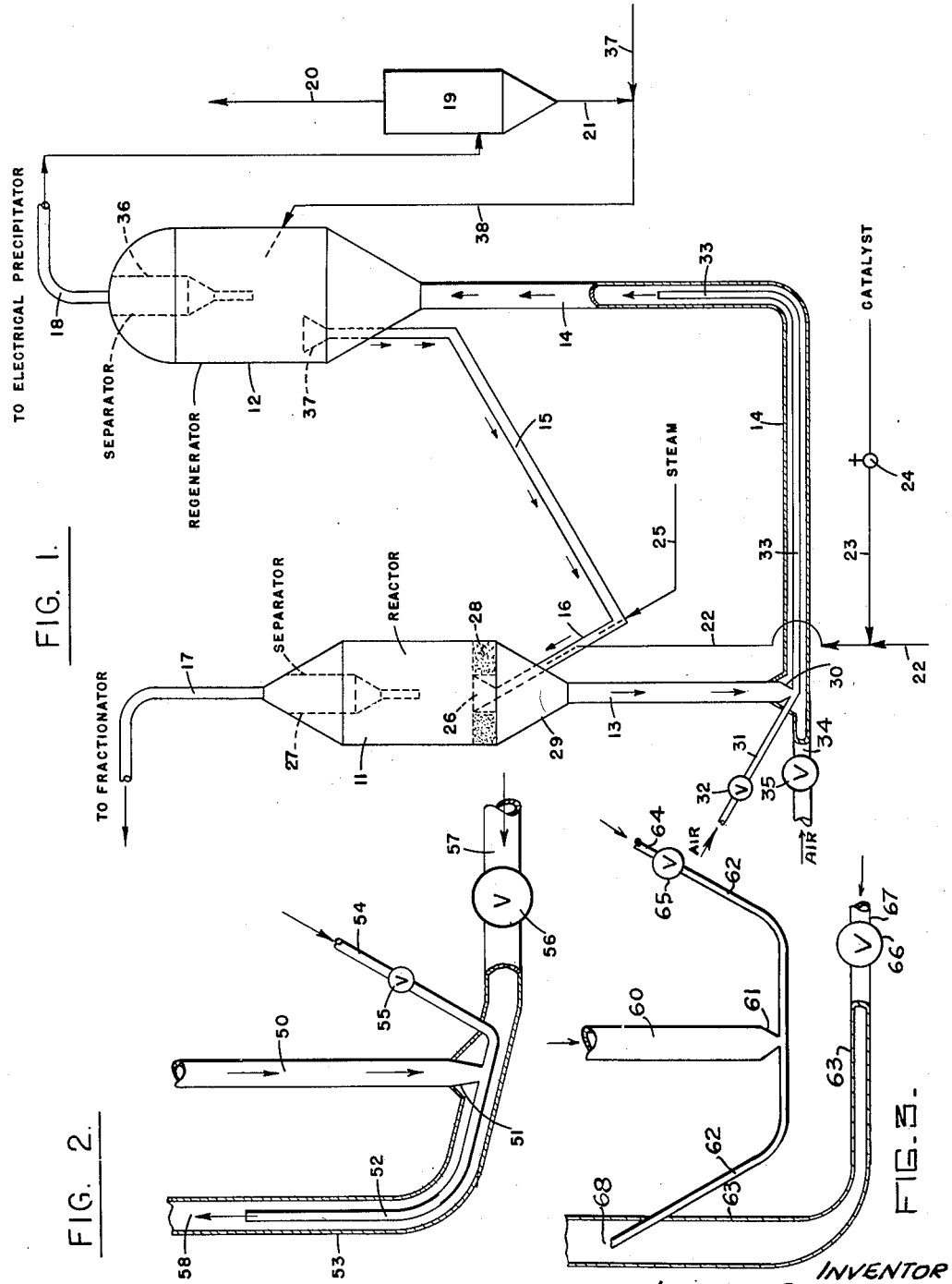

2,541,662

UNITED STATES PATENT OFFICE 2,541,662

DEVICE FOR CONTROLLING FLOW OF SOLIDS IN A POWDERED SOLID AND GAS CONTACTING OPERATION

Jewell S. Palmer, Baytown, Tex., assignor, by mesne assignments, to Standard Oil Development Company, Elizabeth, N. J., a corporation of Delaware Application January 23, 1948, Serial No. 3,904

2 Claims. (Cl. 23—288)

1

The present invention is directed to a device for controlling the flow of solids in a catalytic process in which a fluidized powder is employed as a catalyst therein.

In the catalytic cracking of hydrocarbons, particularly those processes known to the art as the fluidized powder process, a finely divided solid is usually suspended in the petroleum product which is to be cracked. In this operation it is customary to suspend in a hydrocarbon in a vaporized or partially vaporized condition finely divided particles of catalyst which are carried along with the hydrocarbon to a reaction zone wherein conditions of temperature and pressure are maintained to cause cracking of the hydrocarbon. The catalyst is separated from the hydrocarbon in the reaction chamber, and, since it is coated with carbonaceous material and carbon, it is necessary to remove the carbonaceous material and carbon before it is suitable for reuse in the process. Therefore, it is customary to provide a regeneration zone in which combustion conditions are maintained for burning the carbonaceous material and carbon from the catalyst, leaving the catalyst in a condition suitable for reuse in the process.

The enormous amount of heat generated by burning off the carbonaceous material from the catalyst is usually sufficient to maintain cracking conditions in the reaction zone. The regenerated catalyst is then carried back to the reaction zone for reuse in the process as described.

One great difficulty to the operation of the process in which the fluidized solid technique is employed is that the catalyst which flows as a fluid is very difficult to handle in the large conduits required in the process. For example, this catalyst is handled as a fluid although it is a solid and must be routed through valves and lines and other such equipment. Considerable difficulty has been had in controlling such operations on account of the nature of the powdered catalyst. Usually the catalyst flows from the reactor to the regenerator and this flow is controlled by slide valves which are large hydraulically controlled valves. Since these are mechanical operations, these valves are susceptible to all sorts of mechanical difficulties caused primarily by the nature of the solids flowing through the valves. Sometimes the valves, if they remain open for a long period of operating time, may stick and thus make the whole unit unable to control. At other times the valves may be only partially opened and partially closed by the finely divided catalyst which tend to make the valves inoperable. Various other difficulties are encountered such as erosion.

In accordance with the present invention, the difficulties of the prior art are eliminated by providing a device for controlling a fluidized solid operation in which the mechanical controlling means are substantially eliminated.

It is, therefore, one object of the present invention to control a catalytic conversion process in which a fluidized solid catalyst is employed by controlling the flow of the catalyst in relationship to the flow of a fluid.

Another object of the present invention is to control a catalytic cracking operation employing a fluidized powder as the catalyst in which the flow of the fluidized powder is controlled in relaship to the flow of a fluid.

Still another object of the present invention is to eliminate substantially mechanical controlling means in a fluidized catalytic operation in which a finely divided solid is employed as the catalyst.

The objects of the present invention are achieved by controlling the flow of catalyst from the reaction zone or regeneration zone of a catalytic operation independent of mechanical controlling mechanism by maintaining a head of catalyst on a vertical conduit leading into a transverse conduit and flowing the catalyst from the vertical conduit as a dense phase into a disperse phase in the transverse conduit and regulating the amount of finely divided catalyst in the disperse phase in relationship to the amount of a fluidizing medium employed to maintain a dense phase intermediate a disperse phase into which the catalyst is introduced.

Briefly then, the present invention involves the maintenance of a vertical column of catalyst which is introduced into a second vertical conduit into which the first vertical column leads, the flow of catalyst from the first vertical column being controlled by regulating the flow of a fluidizing gas in a conduit connecting into the vertical column of catalyst. In a conduit connecting directly into the vertical column a dense phase of catalyst formed. This dense phase is introduced into a disperse phase and the amount of catalyst in the disperse phase may be controlled by regulating the amount of fluidizing medium employed to form the dense phase of catalyst and to form a pressure head in the second vertical conduit by varying the density in this conduit. It will thus be seen that the present invention involves the flowing of catalyst from a first vertical conduit into a second vertical conduit and the regulation of flow of catalyst from the first vertical conduit to the second vertical conduit by regulating the amount of fluidizing medium introduced into an intermediate zone between the first vertical conduit and the second vertical conduit. In the intermediate zone a dense phase of catalyst is formed and this dense phase is then introduced directly into a disperse phase having a separate supply of fluidizing medium, the quantity of finely divided solids in the disperse phase being controlled by regulating the amount of catalyst particles in the dense phase. Thus, by varying the percentage of solids in the dense phase, which can be done by regulating the flow of fluidizing medium, the amount of particles suspended in the disperse phase may also be regulated. It will be readily seen that the improvement of the present invention allows the substantial elimination of mechanical controlling means in controlling the flow of fluidized solids.

The present invention has greatest application in the so-called fluidized cracking operation and will be illustrated by reference to such operation. However, it is to be understood that the invention is not limited to any particular operation. It may be applied to any operation in which large quantities of solids are circulated through conduits as a fluid in suspension in a suspending medium. Such other applications of the present invention will include the synthesis of hydrocarbons and oxygenated organic compounds from carbon monoxide and hydrogen in which the catalyst for the process is suspended in the feed gas as finely divided particles, the manufacture of phthalic anhydride from naphthalene employing fluidized solids as the catalyst and other processes too numerous to mention here.

In applying the process to the cracking of hydrocarbons employing a finely divided powder such as silica-alumina and other well known cracking catalysts, such as magnesium oxide, zirconium oxide, titanium oxide, and the like, either in admixture with other materials or alone, temperatures in the reaction zone are usually maintained from about 850° to about 1100° F. with a preferred range from about 930° to about 985° F. In the regeneration zone, conditions are maintained to burn off the carbonaceous material and carbon from the catalyst. These temperatures will embrace temperatures in the range from about 850° to about 1200° F. Ordinarily, however, a temperature of around 1100° F. will be employed. Some care must be exercised in the control of the temperature at which the regeneration proceeds. If temperatures are not controlled, the severe temperature conditions might cause destruction of the catalyst.

The pressures employed in the system will vary with the process to be used. In the fluid catalytic cracking of hydrocarbons, pressures in the range from about 3 pounds to about 50 pounds are usually sufficient with a preferred pressure of about 15 pounds per square inch. In the synthesis of hydrocarbons and oxygenated organic compounds from carbon oxides and hydrogen, pressures may vary rather widely and in some instances may be over 500 pounds per square inch. Usually, however, pressures will be in the range from about 150 to about 500 pounds per square inch.

The invention will now be further illustrated by reference to the drawing in which Figure 1 shows a preferred mode of practicing the invention with respect to the fluid catalytic cracking of hydrocarbons;

Figure 2 shows a detail of an arrangement in accordance with the present invention in which the flow of a finely divided solid from a vertical conduit to a transverse conduit as illustrated; and Figure 3 shows another detail of an arrangement in accordance with the present invention in which the flow of a finely divided solid from a vertical conduit to a transverse conduit is illustrated.

Referring now to the drawing and especially to Fig. 1, numeral 11 designates a reaction zone of a fluid catalytic cracking unit in which a finely divided solid, such as silica-alumina, is employed and numeral 12 designates a regeneration zone of a fluid catalytic cracking unit. Reaction zone 11 is fluidly connected to regeneration zone 12 by way of vertical conduit 13 and conduit 14 leading into regeneration zone 12. Regeneration zone 12 is fluidly connected to reaction zone 11 by conduit 15 leading from the regeneration zone 12 and conduit 16 leading into the reaction zone 11, conduits 15 and 16 connecting at an angle. The reaction zone 11 is provided with an outlet pipe 17 leading to a fractionation zone, not shown, and regeneration zone 12 is similarly provided with an outlet pipe 18 which connects into an electrical precipitation apparatus 19. Electrical precipitation apparatus or Cottrell precipitator 19 is provided with a line or stack 20 for discharge of combustion gases and a line 21 for recycling of recovered finely divided catalyst particles in the manner that will be described.

In operating the fluid catalytic cracking operation, a flow of finely divided catalyst is initiated into the system with the catalyst flowing from the reaction zone 11 to the regeneration zone 12. The start-up procedures for such catalytic cracking operations have been well taught in the patent literature and since in themselves do not form a part of my invention, will not be mentioned further here. Suffice to say that a cracking operation has been initiated in the reaction zone 11 and a combustion operation has been initiated in the regeneration zone 12 with the catalyst flowing from the zone 11 to the zone 12 and from the zone 12 to the zone 11. A feed hydrocarbon is introduced into the system by way of line 22 in admixture with finely divided catalyst which may be added as make-up through line 23 controlled by valve 24 to compensate for losses through stack 20. This admixture flows into conduit 16 where it meets the hot catalyst from regeneration zone 12 which causes heating and/or vaporization of the oil introduced by line 22. Steam to aid in the fluidization of the catalyst in the hydrocarbon in line 16 may be introduced by line 25 which ties into lines 15 and 16 at the angle thereof where the two lines meet. The mixture of steam, hydrocarbon, and catalyst then flows to the reaction zone 11 through a funnel shaped member 26 and then upwardly into the zone 11 where a dense phase of catalyst is maintained. The conditions are such in reaction zone 11 that a catalytic cracking reaction takes place and the catalyst and reaction products flow upwardly into a separating means 27 which may be a cyclone separator, filter, or any other separating means to remove the finely divided solid particles of the catalyst from the product. The catalyst drops backwardly into the reaction zone 11 while the products issue through outlet pipe 17 to a fractionation zone, not shown. The catalyst in the reaction zone 11, by virtue of the large diameter of the vessel in which the reaction zone is maintained, has its velocity substantially reduced and thus maintains a rather dense phase of catalyst in hydrocarbon and steam. The catalyst falls back to the outer annulus of the reaction zone and drops down to a stripping zone 28 in which a stripping medium, such as steam, may be introduced by means not shown to remove strippable hydrocarbon and carbonaceous material from the catalyst prior to its dropping downwardly to the cone shaped portion 29 of reaction zone 11 and then into conduit 13. A head of catalyst is maintained in conduit 13. This catalyst flows downwardly into a cone 30 which increases its velocity by restriction of the flow. At this point the catalyst flowing therethrough is met by a stream of air or other oxygen-containing gas or fluidizing medium which is introduced by line 31 controlled by valve 32. This stream introduced by line 31 controls the rate of catalyst addition into the conduit 33. It will thus be seen that by manipulation of valve 32 the flow of catalyst from conduit 13 to conduit 33 may be regulated. The valve 32 may be automatically controlled in response to various operating conditions in the unit. A dense phase is formed in conduit 33 into which conduit 13 and line 31 converge. This conduit 33 is concentric with conduit 14 and extends upwardly into the vertical portion of conduit 14 as shown. It will thus be seen that the dense phase in conduit 13 is introduced into a disperse phase in conduit 14, conduit 14 being supplied with an independent source of fluidizing medium which may be air or other free oxygen-containing gas introduced by line 34 and controlled by valve 35. Thus, in effect, a dense phase is formed in conduit 33 and the dense phase in conduit 33 is then introduced into a disperse phase in conduit 14 with the quantity of catalyst in the disperse phase in conduit 14 being regulated by control of air introduced by line 31. It will be noted also that a quantity of air sufficient to form disperse phase in conduit 14 is introduced by line 34. The larger amount of air for the transporting of the fluidized catalyst particles from conduit 13 into conduit 14 to regenerator 12 will be admitted by line 34. However, the amount of air introduced by line 31 will be the sole control of the amount of catalyst flowing from the reaction zone 11 to regenerator 12.

The amount of fluidizing medium injected by valve 32 will be governed by the height of conduit 33 in the vertical portion of conduit 14 and the density of suspension necessary to balance the pressure at the terminus of conduit 13. In a commercial size unit in which a pressure in the range from 20 to 35 pounds per square inch gauge is carried on the equivalent of conduit 13, the height of conduit 33 in the vertical portion of conduit 14 and the amount of air or fluidizing medium injected by valve 32 will be dependent on the pressure carried in the reactor 11. For example, in a unit charging about 35,000 barrels of feed stock per day in which a pressure of 25 pounds per square inch is maintained in the reactor, the height of conduit 33 and the amount of air or fluidizing medium will be adjusted to maintain a pressure head of about 25 pounds per square inch in conduit 33 and a pressure in conduit 14 of about 10 pounds per square inch gauge. It will be realized that lowering the height of conduit 33 in the vertical portion of conduit 14 and decreasing the amount of fluidizing medium introduced by valve 32 will effect a corresponding increase in pressure differential. When the amount of fluidizing medium such as air introduced by valve 32 is decreased, the amount introduced by valve 35 should be increased and vice versa.

The disperse phase in line 14 flows into regenerator 12 where combustion conditions are maintained. The catalyst in a suspension in combustion products flows into a separator 36 which, similar to separator 27, may be a cyclone separator, filter, or other equivalent separating means whereby catalyst in a finely divided form may be separated from gases. The catalyst falls backward into the regenerator 12 and thence into a funnel-shaped member 37 which connects into conduit 15 and transports the catalyst from the regenerator 12 to the reactor 11.

The combustion products discharge by way of line 18 to an electrical precipitation apparatus 19 which may be a Cottrell precipitator wherein the finely divided catalyst particles, which may be carried over in the combustion products, are substantially separated therefrom. These finely divided particles drop down through line 21 and are carried back by a fluidizing gas introduced by line 37 through line 38 to the regenerator 12 for reuse in the process. The flue gases and combustion products are discharged by a stack 20.

Referring now to Fig. 2, from a standpipe or a vertical conduit 50 a vertical column of finely divided solid particles, from a source not shown, are introduced into a cone-shaped member 51 which in turn discharges into a conduit 52 which is concentric with a larger conduit 53. Conduit 52 is provided with a source of a fluidizing gas which is introduced by a line 54 from a source not shown and the introduction thereof is controlled by valve 55. A valve 56 controls the introduction of additional amounts of fluidizing gases by way of line 57. In conduit 52 a dense phase of finely divided solid particles introduced from conduit 50 is maintained by introduction of a fluidizing gas by line 54. In conduit 53 a disperse phase of finely divided solid particles is maintained by introduction of the dense phase into the disperse phase which will be formed in the region indicated by the numeral 58. The disperse phase is formed by admixture of the dense phase from conduit 52 with the additional quantities of fluidizing medium introduced by line 57. Prior to the present invention it was customary to control introduction of finely divided particles from a conduit such as conduit 50 by mechanical means such as a slide valve. It will thus be seen that in accordance with the present invention the slide valve is omitted and substituted for by a valve controlling a gaseous medium rather than a column of solid particles. It is well known to the art that flow of gases and other fluids may be easily controlled by valves and such arrangements. It will be within the spirit and scope of the present invention to cause the opening and closing and the regulation of valve 55 in response to some variation in operating conditions in the unit in which the dense phase in conduit 55 is introduced into a disperse phase such as in the conduit 53.

Turning now to Figure 3, a standpipe or vertical conduit 60 provides a vertical column of finely divided solid particles from a source not shown from which the finely divided solids pass into a cone-shaped member 61 which discharges into conduit 62. Conduit 62 is exterior to a larger conduit 63. Conduit 62 is provided with a source of fluidizing gas which is introduced through line 64 from a source not shown and the introduction of the gas is controlled by valve 65. A valve 66 is used to control the introduction of fluidizing gas into conduit 63 from conduit 67. A dense phase of finely divided solid particles formed in conduit 62 by the introduction of fluidizing gas from line 64 passes upwardly and is introduced into zone 63 at a point indicated by the numeral 68. A disperse phase is formed at point 68 by admixture of the dense phase from conduit 62 with additional quantities of fluidizing medium introduced through line 67. It is thus seen that it is not necessary to maintain pipe 62 on the interior of and concentric with pipe 63 as shown in previous illustrations in order to obtain the improved results from the practice of my invention.

The catalyst or the finely divided particles employed in the practice of the present invention will generally have particle diameters in the range from about 0 micron to 100 microns with the major amount in the range from about 20 microns to 80 microns. If too large a quantity of the catalyst have particle diameters in the range from about 0 to 20 microns in an operation such as a fluidized catalytic cracking operation as described in connection with Fig. 1, a large quantity of the catalyst may be lost through the stack 20. On the other hand, if a substantial amount of the catalyst has particle diameters in the range from 80 to 100 microns, fluidization characteristics of the catalyst may be impaired. Therefore, a balance between the finely divided particles of the catalyst and the larger particles of the catalyst should be maintained.

While the invention has been described with respect to a fluidized catalytic cracking operation, it is to be emphasized that it has broader application than to controlling such operations. It also has application to controlling pressure drop across a conduit by opposing a head of finely divided particles or other materials being transported with a fluidizing medium to balance the head of finely divided particles.

The nature and objects of the present invention, having been fully described and illustrated, what I wish to claim as new and useful and to secure by Letters Patent is:

1. A device adapted for suspending finely divided solid catalyst in a catalytic cracking operation having an enlarged regeneration zone with a vertical inlet line connecting into the lower portion thereof and an enlarged reaction zone with a vertical outlet line connected into the lower end thereof, a first conduit of substantially the same diameter as said inlet and outlet lines connecting said outlet line with said inlet line, a second conduit arranged within said first conduit and concentric therewith with a discharge end within the inlet line of said regeneration zone, a hopper member fluidly connecting said outlet line with said second conduit, a first inlet pipe line including a valve to control the flow of fluid therein arranged to discharge into said first conduit and a second inlet pipe line including a valve to control the flow of fluid therein arranged to discharge into the second conduit adjacent the point of connection of the hopper member with the second conduit.

2. A device adapted for suspending finely divided solid catalyst in a catalytic operation having an enlarged regeneration zone with a vertical inlet line connecting into the lower portion thereof and an enlarged reaction zone with a vertical outlet line connected into the lower end thereof, a first conduit including a valve to control the flow of fluid therein having its discharge end connected to the lower end of said vertical inlet line, a second conduit smaller than said vertical inlet line having its discharge end within and concentric with the vertical inlet line, the discharge end of said second conduit pointing upwardly toward said regenerator and being above the point of connection of the first conduit with said vertical inlet line end, a hopper member fluidly connecting the lower end of said vertical outlet line with the inlet end of said second conduit and a third conduit including a valve to control the flow of fluid therein having its discharge end connected to said second conduit adjacent the point of connection of the hopper member with said second conduit.

JEWELL S. PALMER.

REFERENCES CITED

The following references are of record in the file of this patent:

UNITED STATES PATENTS

| Number | Name | Date |
|---|---|---|
| 2,399,050 | Martin | Apr. 23, 1946 |
| 2,428,872 | Gunness | Oct. 14, 1947 |
| 2,437,352 | Fragen | Mar. 9, 1948 |
| 2,457,232 | Hengstebeck | Dec. 28, 1948 |